United States Patent
Aare

(10) Patent No.: US 9,573,200 B2
(45) Date of Patent: Feb. 21, 2017

(54) SUPPORT PAD AND CUTTER HEAD FOR ROTATING CUTTING TOOL

(71) Applicant: SANDVIK INTELLECTUAL PROPERTY AB, Sandviken (SE)

(72) Inventor: Magnus Aare, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 8 days.

(21) Appl. No.: 14/717,305

(22) Filed: May 20, 2015

(65) Prior Publication Data

US 2015/0336184 A1 Nov. 26, 2015

(30) Foreign Application Priority Data

May 21, 2014 (EP) .................................... 14169307

(51) Int. Cl.
*B23B 51/06* (2006.01)
*B23B 51/04* (2006.01)
*B23B 41/02* (2006.01)

(52) U.S. Cl.
CPC .......... *B23B 51/0486* (2013.01); *B23B 41/02* (2013.01); *B23B 51/06* (2013.01); *B23B 2251/422* (2013.01); *B23B 2251/56* (2013.01); *Y10T 408/44* (2015.01); *Y10T 408/5586* (2015.01); *Y10T 408/892* (2015.01)

(58) Field of Classification Search
CPC . B23B 2251/56; B23B 51/0486; B23B 41/02; B23B 51/06; Y10T 408/5586; Y10T 408/892; Y10T 408/44
See application file for complete search history.

(56) References Cited

U.S. PATENT DOCUMENTS

| 4,596,498 A | 6/1986 | Kress |
| 6,602,028 B1 | 8/2003 | Lindblom et al. |
| 2007/0092347 A1* | 4/2007 | Ananolli ............. B23B 51/0493 408/81 |
| 2007/0147964 A1 | 6/2007 | Cantz et al. |
| 2010/0054879 A1 | 3/2010 | Nedzlek |
| 2013/0051944 A1 | 2/2013 | Wenzelburger et al. |

FOREIGN PATENT DOCUMENTS

| EP | 2198996 A2 * | 6/2010 | ......... B23B 51/0486 |
| WO | 2009030188 | 3/2009 | |
| WO | 2012172537 | 12/2012 | |

* cited by examiner

*Primary Examiner* — Sunil K Singh
*Assistant Examiner* — Alan Snyder
(74) *Attorney, Agent, or Firm* — Corinne R. Gorski

(57) ABSTRACT

A rotating cutting tool configured to rotate around an axis of rotation in a rotary direction, and a support pad for such a tool is disclosed. The support pad defines a central longitudinal axis and has a first longitudinal edge side, an opposite second longitudinal edge side, a first transversal edge side and an opposite second transversal edge side. The support pad includes a first support surface, which is convexly curved as viewed in a plane perpendicular to the central longitudinal axis and a first recess, which extends into the first support surface in a direction from the first longitudinal edge side towards the second longitudinal edge side. The first recess extends to a final position on the first support surface.

19 Claims, 5 Drawing Sheets

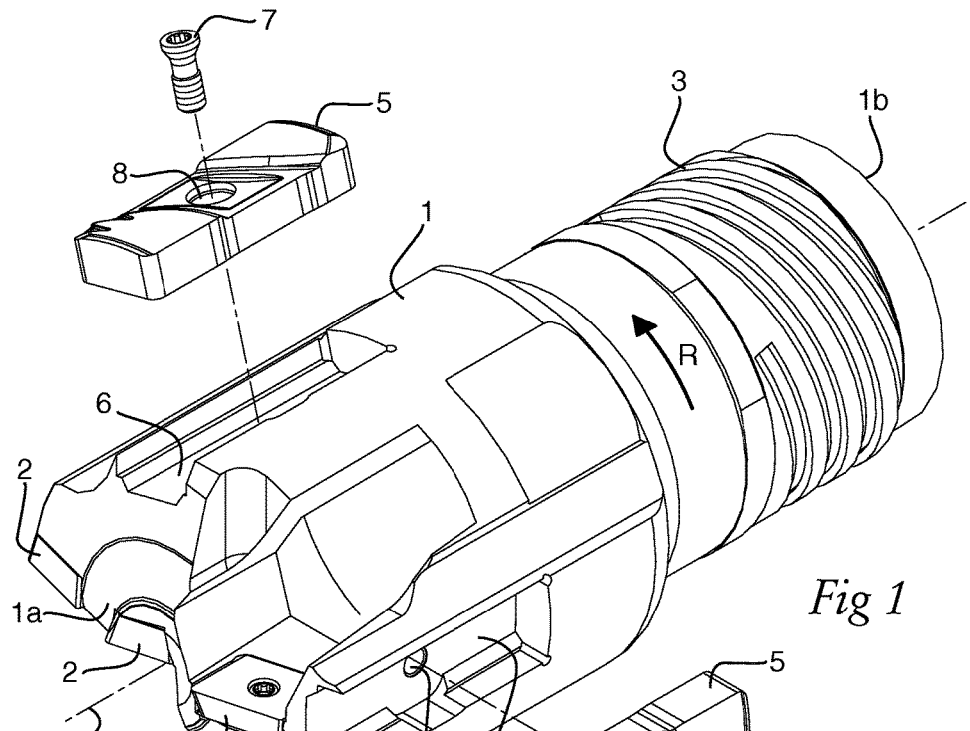
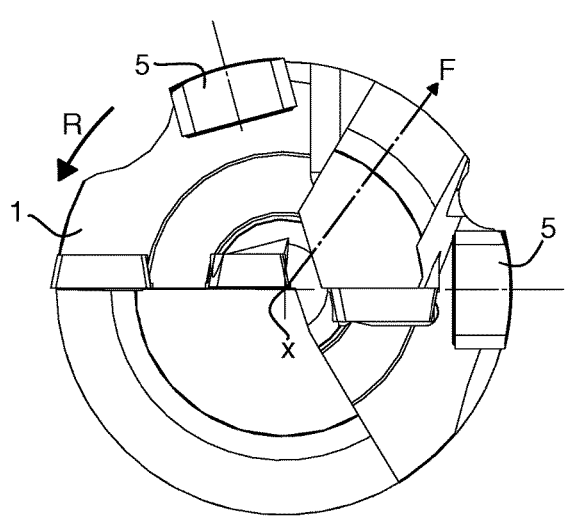
Fig 1
Fig 2

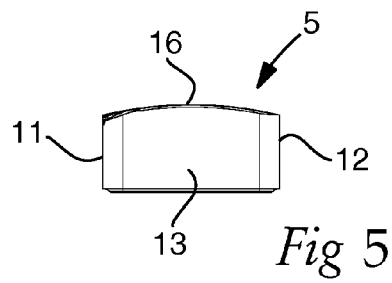
Fig 5
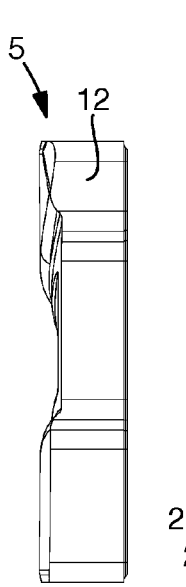
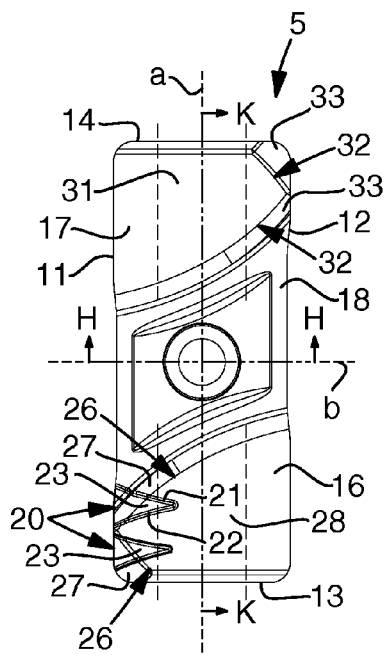
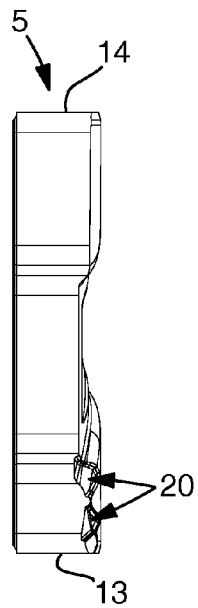
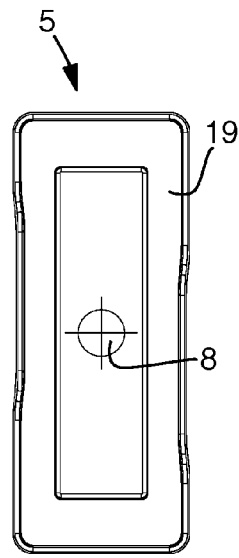
Fig 6　　Fig 7　　Fig 8　　Fig 9
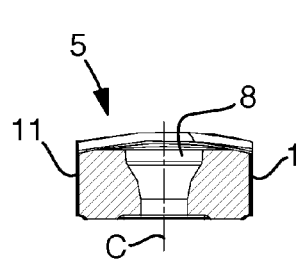
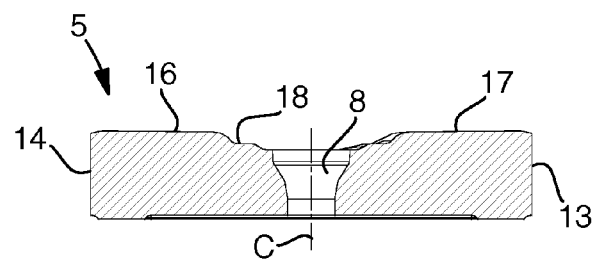
Fig 10　　Fig 11

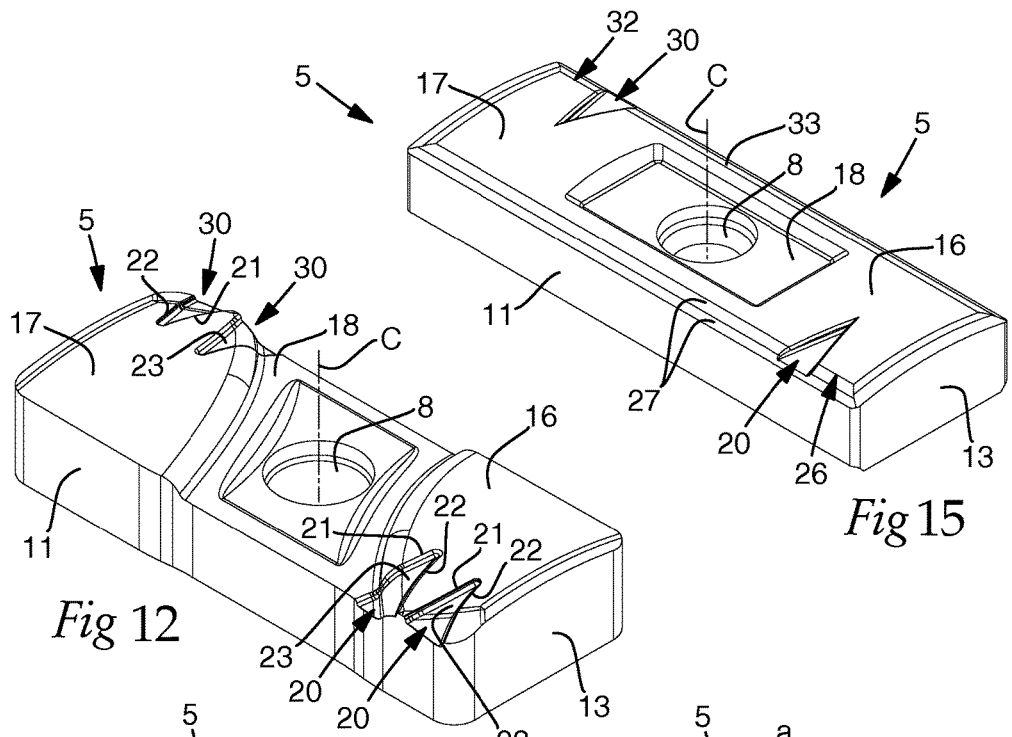
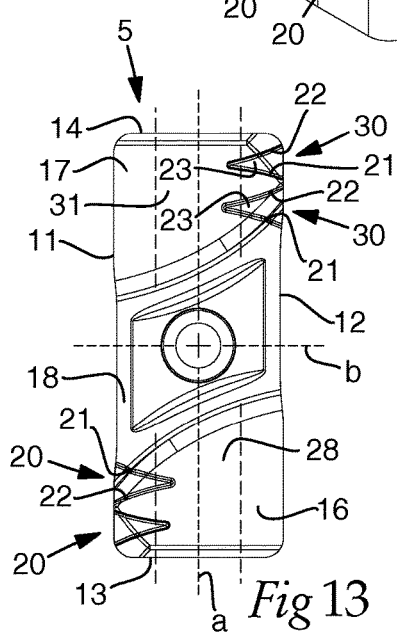
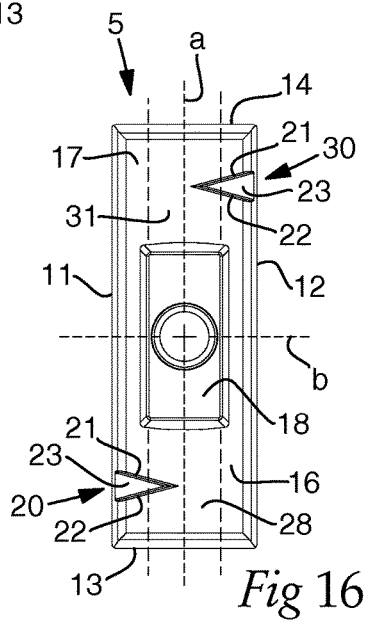
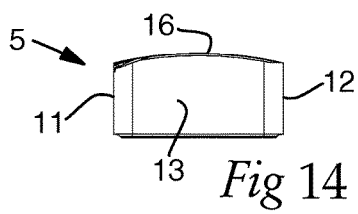
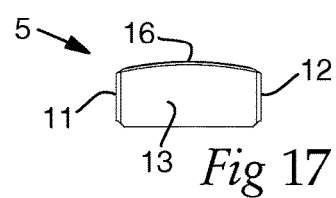

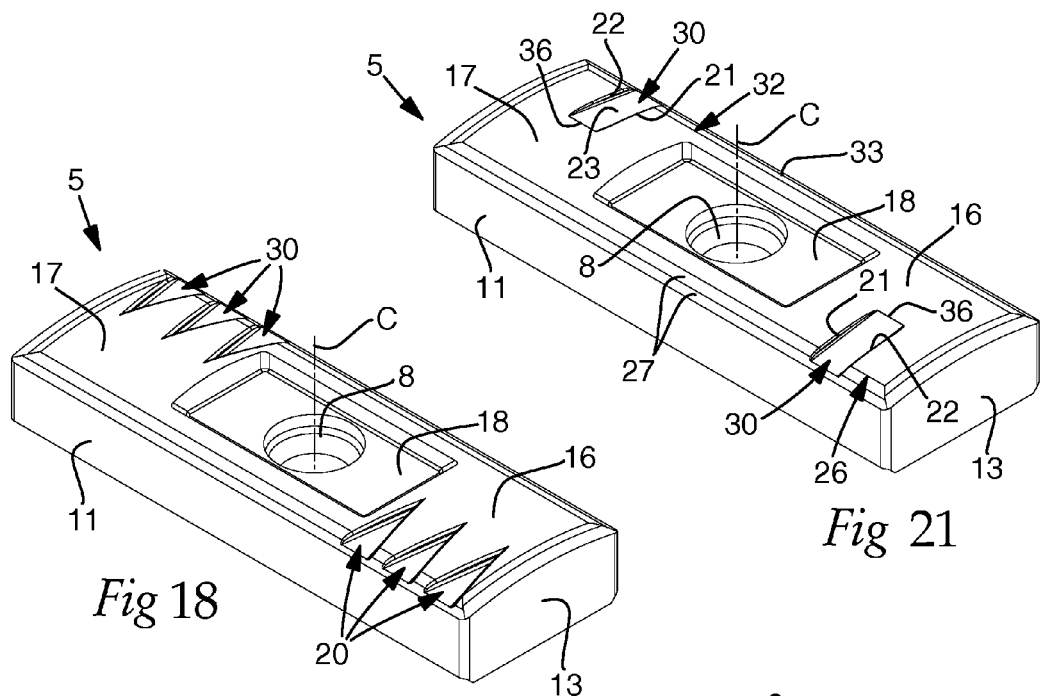
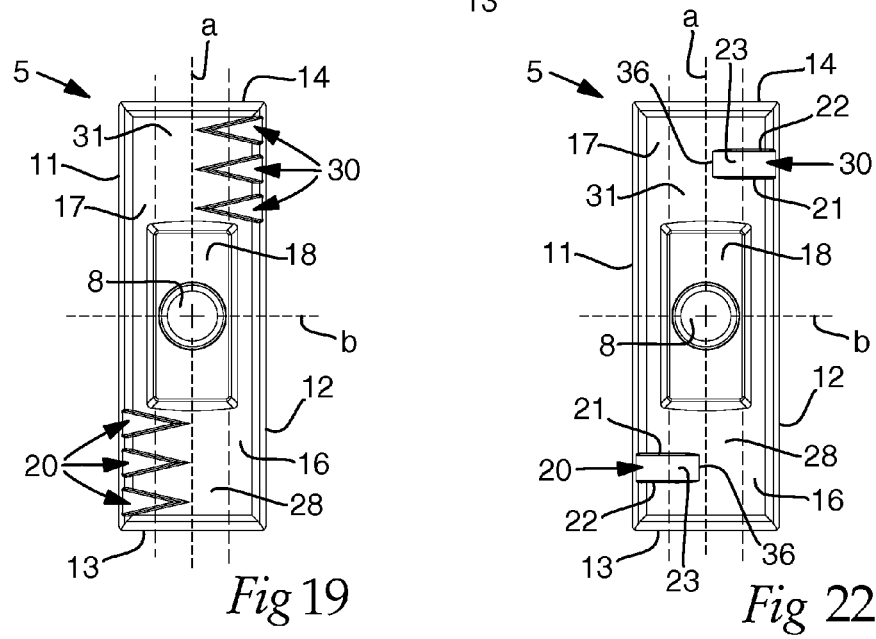
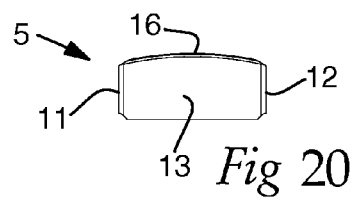
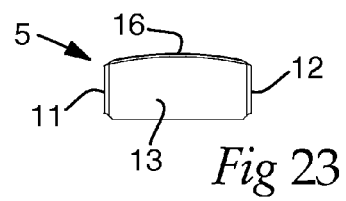

SUPPORT PAD AND CUTTER HEAD FOR ROTATING CUTTING TOOL

RELATED APPLICATION DATA

This application claims priority under 35 U.S.C. §119 to patent application Ser. No. 14169307.7, filed on May 21, 2014, which the entirety thereof is incorporated herein by reference.

TECHNICAL FIELD

The present disclosure refers to a support pad for a rotating cutting tool, especially a deep-hole drilling tool The present disclosure also refers to a cutter head for a rotating cutting tool, especially a deep-hole drilling tool.

BACKGROUND

A support pad, sometimes referred to as a support bar, guide pad, or guide bar is used during cutting in metals and other hard materials on for instance cutter heads of deep-hole drilling tools. The purpose of the support pad is to support and guide the deep-hole drilling tool by sliding against the wall of the hole being drilled, and also to prevent wear of the cutter head.

In addition to the supporting function, the support pad also contributes to finishing and smoothing of the surface of the wall of the hole.

The support pad is subjected to strong wear due to the high temperature load in the contact zone between the support pad and the wall of the hole. The wear and the temperature load constitutes a problem, which can lead to heat cracks in the support surface of the support pad, which eventually could lead to breakage of the support pad.

In the prior art, see below, this problem has been addressed by supplying cooling and/or lubricating liquids to the contact zone in order to reduce the heat load.

US 2013/0051944 discloses a support guide pad for a rotating cutting tool rotating around an axis of rotation in a rotary direction. The support pad defines a central longitudinal axis and has a first longitudinal edge side, an opposite second longitudinal edge side, a first transversal edge side and an opposite second transversal edge side. The support pad includes a support surface, which is convexly curved as viewed in a plane perpendicular to the central longitudinal axis. Lubricating grooves extends in the support surface in a direction from the first longitudinal edge side. In one embodiment, the grooves extend to the second longitudinal edge side. In another embodiment, the grooves extend to the first transversal edge side.

U.S. Pat. No. 6,602,028 discloses a support pad for a rotating cutting tool rotating around an axis of rotation in a rotary direction. The support pad defines a central longitudinal axis and has a first longitudinal edge side, an opposite second longitudinal edge side, a first transversal edge side and an opposite second transversal edge side. The support pad has a first contact surface and a second contact surface, which are convexly curved.

WO2012/172537 discloses a support pad for a rotating cutting tool rotating around an axis of rotation in a rotary direction. The support pad defines a central longitudinal axis and has a first longitudinal edge side, an opposite second longitudinal edge side, a first transversal edge side and an opposite second transversal edge side. The support pad has a first convex contact surface and a second convex contact surface.

WO 2009/030188 discloses a support pad for a rotating cutting tool rotating around an axis of rotation in a rotary direction. The support pad defines a central longitudinal axis and has a first longitudinal edge side, an opposite second longitudinal edge side, a first transversal edge side and an opposite second transversal edge side. The support pad includes a support surface. Channels for cooling and/or lubricating liquid extend to an area in the proximity of the support pad for cooling and/or lubrication thereof.

SUMMARY

An aspect of the present disclosure is to remedy the problem discussed above. A further aspect is to improve the cooling and/or lubrication of the support pad, and thus to improve the lifetime of the support pad.

These and further aspects are achieved by the support pad initially defined, having at least one first recess that extends to a final position on the first support surface.

Due to this first recess, cooling and/or lubricating liquid, such as oil, will be supplied to and collected in therein during operation of the rotating cutting tool. A larger quantity of cooling and/or lubricating liquid will thus be conveyed to the contact zone between the support surface and the wall of the hole. A pressure will be created in the first recess, which will press the cooling and/or lubricating liquid towards the wall of the hole, thereby permitting a film of cooling and/or lubricating liquid to be created between the first support surface and the wall of the hole. Such a film will reduce the heat load and the wear of the support pad, and thus improve the lifetime of the support pad.

The support pad may include more than one such first recess, for instance two, three, four etc., with such first recesses extending into the first support surface in a direction from the first longitudinal edge side towards the second longitudinal edge side, and to a final position on the first support surface.

According to an embodiment, the at least one first recess has a flow area which decreases towards the final position. Such a decreasing flow area will result in a higher pressure in the at least one first recess, which improves the capability of building up a film of cooling and/or lubricating liquid between the first support surface and the wall of the hole.

According to a further embodiment, the at least one first recess tapers towards the final position on the first support surface seen in a normal direction to the first support surface. Such a tapering decreases the flow area towards the final position on the first support surface.

According to a further embodiment, the at least one first recess has, or is defined by, a bottom, a first side and a second side.

According to a further embodiment, the tapering may be obtained by the first side and the second side approaching each other to meet at the final position.

According to a further embodiment, the first side and the second side form an angle, preferably at the most 90°. Advantageously, the angle is an acute angle, preferably at the most 70°, more preferably at the most 50°, and most preferably at the most 30°.

According to another embodiment, the distance between the bottom and the first support surface decreases towards the final position. In other words, the depth of the first recess decreases towards the final position. Such a decreasing distance or depth also results in a decreasing flow area of the first recess towards the final position, and thus in a high pressure in the first recess. In this case, with a decreasing distance or depth, the first and second sides may be parallel or even diverging.

According to a further embodiment, the decreasing flow area towards the final position is obtained by a combination of a decreasing distance between the bottom and the first support surface and approaching first and second sides.

According to an embodiment, the first and second sides are straight, or substantially straight.

According to a further embodiment, the first and second sides are convexly curved.

According to another embodiment, the first support surface has a first border line in the proximity of or adjoining the first longitudinal edge side, wherein the at least one first recess extends at least from the first border line to the final position. Consequently, the at least one first recess forms an inlet opening for the cooling and/or lubricating liquid at least at the first border line of the first support surface. The inlet opening meets the rotary direction of the rotating cutting tool. The at least one recess may extend from, or start at, the first longitudinal edge side.

According to a further embodiment, the support pad includes a first bevel surface connecting the first longitudinal edge side to the first support surface. Such a bevel surface strengthens the support pad at the transition between the first support surface and the first longitudinal edge side. Such a bevel surface may also be advantageous with respect to the finishing work of the wall of the hole to be made.

According to another embodiment, the first bevel surface can be a straight bevel surface and/or a curved bevel surface, especially a convexly curved bevel surface.

According to yet another embodiment, the final position is located in a first mid-area on the first support surface. Thus, there is a certain distance from the final position to the second longitudinal edge side. Such a distance ensures that there is a region of the first support surface located between the final position of the at least one first recess and the second longitudinal edge side, which region will be provided with a film of cooling and/or lubricating liquid.

The first mid area may extend symmetrically from the central longitudinal axis and have a width of at the most 80% of the transversal width of the support pad.

According to a further embodiment, the first longitudinal edge side of the support pad is configured to form a forward edge side with respect to the first support surface and the rotary direction. In other words, the first longitudinal edge side meets the rotary direction of the rotating cutting tool.

According to an embodiment, the support pad defines a central transversal axis perpendicular to the central longitudinal axis, and wherein the first support surface is located between the first transversal edge side and the central transversal axis. The support pad thus has a length along the central longitudinal axis and a width along the central transversal axis, wherein the length is longer than the width.

According to a further embodiment, the support pad includes a second support surface, which is convexly curved as viewed in a plane perpendicular to the central longitudinal axis.

According to an embodiment, the second support surface is located between the second transversal edge side and the central transversal axis. The support pad may thus be indexable around a central axis perpendicular to the central longitudinal axis and the central transversal axis.

Alternatively or supplementary, the second support surface is located on the other side of the support pad, i.e. the support pad may be indexable around the central longitudinal axis or the central transversal axis.

According to a further embodiment, the support pad includes at least one second recess, which extends into the second support surface in a direction from the second longitudinal edge side towards the first longitudinal edge side to a final position on the second support surface.

The support pad may have more than one such second recess, for instance two, three, four etc., such second recesses extending into the second support surface in a direction from the second longitudinal edge side towards the first longitudinal edge side, and to a final position on the second support surface.

According to a further embodiment, the at least one second recess has a flow area which decreases towards the final position. Such a decreasing flow area will result in a higher pressure also in the at least one second recess, which improves the capability of building up a film of cooling and/or lubricating liquid between the second support surface and the wall of the hole.

According to a further embodiment, the at least one second recess tapers towards the final position on the second support surface seen in a normal direction to the second support surface. Such a tapering decreases the flow area towards the final position on the second support surface.

According to another embodiment, the at least one second recess has, or is defined by, a bottom, a first side and a second side.

According to a further embodiment, the tapering may be obtained by the first side and the second side approaching each other to meet at the final position on the second support surface.

According to an embodiment, the first side and the second side form an angle, preferably at the most 90°. Advantageously, the angle is an acute angle, preferably at the most 70°, more preferably at the most 50° and most preferably at the most 30°.

According to a further embodiment, the distance between the bottom and the second support surface decreases towards the final position. In other words, the depth of the second recess decreases towards the final position on the second support surface. Such a decreasing distance or depth also results in a decreasing flow area of the second recess towards the final position, and thus in a high pressure in the second recess. As for the at least one first recess, the first and second sides may be parallel or even diverging when the distance or depth decreases.

According to a further embodiment, the decreasing flow area towards the final position on the second support surface is obtained by a combination of a decreasing distance between the bottom and the second support surface and approaching first and second sides.

According to another embodiment, the first and second sides of the at least one second recess are straight, or substantially straight.

According to a further embodiment, the first and second sides of the at least one second recess are convexly curved.

According to an embodiment, the second support surface has a second border line in the proximity of or adjoining the second longitudinal edge side, wherein the at least one second recess extends at least from the second border line to the final position on the second support surface. Consequently, the at least one second recess forms an inlet opening for the cooling and/or lubricating liquid at least at the second border line of the second support surface. During active use of the second support surface of the support pad, the inlet opening meets the rotary direction of the rotating cutting tool. The at least one second recess may extend from, or start at, the second longitudinal edge side.

According to an embodiment, the support pad includes a second bevel surface connecting the second longitudinal edge side to the second support surface. Such a bevel surface strengthens the support pad at the transition between the second support surface and the second longitudinal edge side. Such a bevel surface may also be advantageous with respect to the finishing work of the wall of the hole to be made.

According to a further embodiment, the second bevel surface includes a straight bevel surface and/or a curved bevel surface, especially a convexly curved bevel surface.

According to a further embodiment, the final position is located in a second mid-area on the second support surface. There is thus a certain distance from the final position to the first longitudinal edge side. Such a distance ensures that there is a region of the second support surface located between the final position of the at least one second recess and the first longitudinal edge side, which region will be provided with a film of cooling and/or lubricating liquid.

The second mid-area may extend symmetrically from the central longitudinal axis and have a width of at the most 80% of the transversal width of the support pad.

According to a further embodiment, the second longitudinal edge side of the support pad is configured to form a forward edge side with respect to the second support surface and the rotary direction.

The object is also achieved by the cutter head initially defined for a rotating cutting tool configured to rotate around an axis of rotation in a rotary direction, wherein the cutter head comprises at least one seat configured to receive a support pad as defined above.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 1 is a perspective view of a rotating cutting tool with two support pads according to the invention.

FIG. 2 is an end view of the rotating cutting tool 1 in FIG. 1.

FIG. 5 is an end view of the support pad in FIG. 3.

FIG. 6 is a side view of the support pad in FIG. 3.

FIG. 7 is a top view of the support pad in FIG. 3.

FIG. 8 is another side view of the support pad in FIG. 3.

FIG. 9 is a bottom view of the support pad in FIG. 3.

FIG. 10 is a cross-sectional view along the line H-H in FIG. 7.

FIG. 11 is a cross-sectional view along the line K-K in FIG. 7.

FIG. 12 is a perspective view from above of a support pad according to a second embodiment.

FIG. 13 is a top view of the support pad in FIG. 12.

FIG. 14 is an end view of the support pad in FIG. 12.

FIG. 15 is a perspective view from above of a support pad according to a third embodiment.

FIG. 16 is a top view of the support pad in FIG. 15.

FIG. 17 is an end view of the support pad in FIG. 15.

FIG. 18 is a perspective view from above of a support pad according to a fourth embodiment.

FIG. 19 is a top view of the support pad in FIG. 18.

FIG. 20 is an end view of the support pad in FIG. 18.

FIG. 21 is a perspective view from above of a support pad according to a fifth embodiment.

FIG. 22 is a top view of the support pad in FIG. 21.

FIG. 23 is an end view of the support pad in FIG. 21.

DETAILED DESCRIPTION

Figure 3:
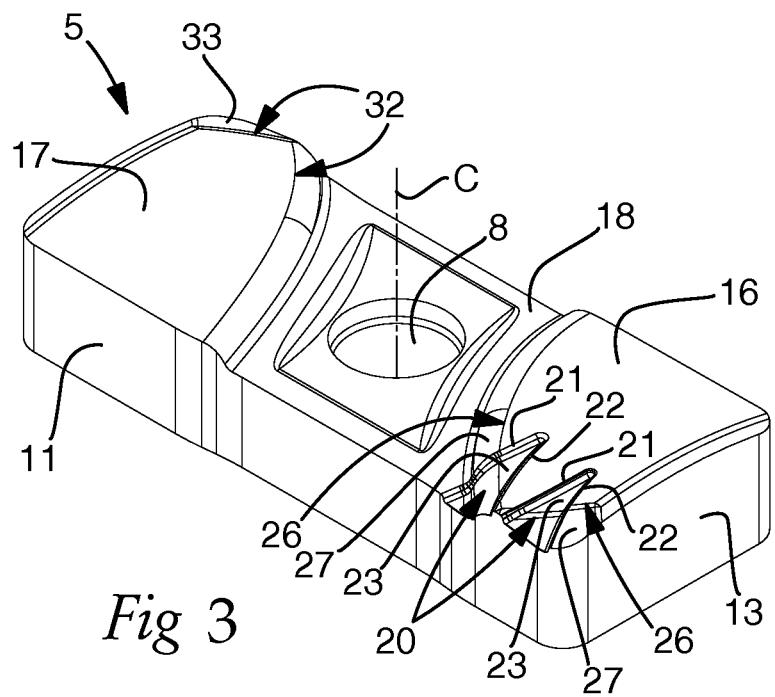
FIG. 3 is a perspective view from above of a support pad according to a first embodiment.

FIGS. 1 and 2 disclose a rotating cutting tool 1 in the form of a cutter head for a deep-hole drilling tool. The rotating cutting tool 1 has a forward end 1a and a rearward end 1b. Three cutting inserts 2 are provided at the forward end 1a. An external thread 3 is provided at the rearward end 1b for attachment of the rotating cutting tool 1 to, for example, a drill tube, which may be carried by a suitable supporting device.

The rotating cutting tool 1 includes, in the example disclosed, two support pads 5, which are attachable in a respective seat 6 in the rotating cutting tool 1. The support pads 5 may for instance be attached in the respective seat 6 by a respective attachment screw 7. The attachment screw 7 extends through a center hole 8 of the support pad 5 into a threaded hole 9 through a bottom surface of the seat 6. It is to be noted that the support pads 5 also may be attached to the rotary cutting toll 1 by, for instance, gluing or brazing. The center hole 8 may then be unnecessary.

The rotating cutting tool 1 is configured to rotate around an axis x of rotation in a rotary direction R. The three cutting inserts 2 are positioned such that their respective cutting edges are positioned along an essentially straight line being perpendicular to the axis x of rotation. During operation, when the rotating cutting tool 1 rotates in the rotary direction R, the cutting inserts 2 will cut and remove borings or chips from a work piece so that a hole is formed in the work piece.

In the example disclosed, two of the cutting inserts 2 are positioned on mainly one side of the axis x of rotation and one of the cutting inserts 2 on the other side of the axis x of rotation. This arrangement of the cutting inserts 2 will have to effect that the rotating cutting tool 1 will be actuated by a resultant force F, see FIG. 2. In order to balance and take up the resultant force F, the support pads 5 are positioned on a respective side of the resultant force F so that a support surface, explained further below, of each of the support pads 5 will bear and slide against an inner surface of the wall of the hole that is being drilled. In this way, it is ensured that the rotating cutting tool 1 will not wear against the wall of the hole. Instead, the support pads 5 will be subjected to essentially all wearing against the wall of the hole. Moreover, the support pads 5 will guide and center the rotating cutting tool 1 to ensure that the rotating cutting tool 1 follows a straight line during the deep-hole drilling.

Figure 4:
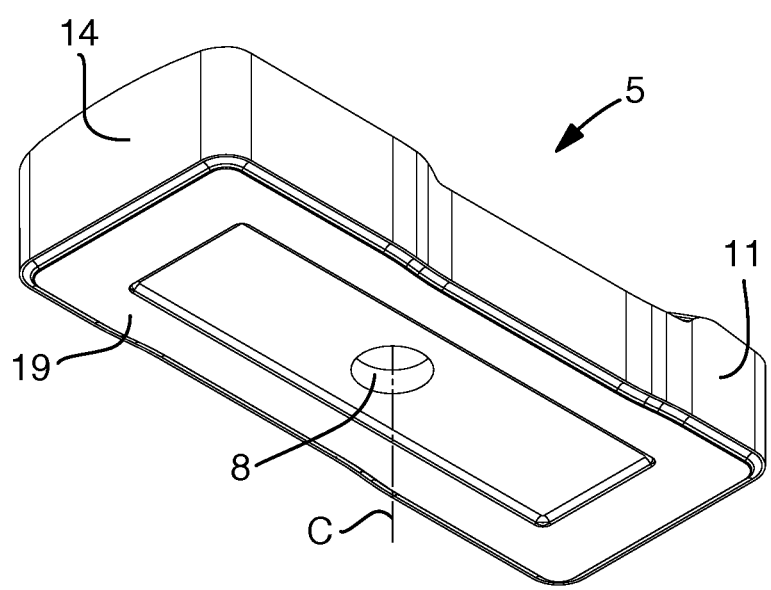
FIG. 4 is a perspective view from below of the support pad in FIG. 3.

FIGS. 3-11 disclose a first embodiment of the support pad 5. The support pad 5 defines a central longitudinal axis a, and a central transversal axis b, which is perpendicular to the central longitudinal axis a, see FIG. 7. A central axis c extends through the support pad 5 perpendicularly to the central transversal axis b and to the central longitudinal axis a, see FIG. 3. The central axis c extends in the embodiments disclosed through the central hole 8.

The support pad 5 has a length along the central longitudinal axis a, and a width along the central transversal axis b. The length is longer, or significantly longer, than the width.

The support pad 5 has a first longitudinal edge side 11, an opposite second longitudinal edge side 12, a first transversal edge side 13 and an opposite second transversal edge side 14. The first longitudinal edge side 11 and the second longitudinal edge side 12 are parallel, or substantially parallel, to the central longitudinal axis a. The first transversal edge side 13 and the second transversal edge side 14 are parallel, or substantially parallel, to the central transversal axis b.

In the first embodiment, the support pad 5 has an overall rectangular shape as can be seen in the top view illustrated in FIG. 7. It is to be noted that the longitudinal edge sides 11, 12, as can be seen in FIGS. 7 and 9, and/or the transversal edge sides 13, 14 do not have to be perfectly straight.

The support pad 5 includes a first support surface 16 and a second support surface 17. As mentioned above, the first and second support surfaces 16, 17 are configured to abut the wall of the hole during operation of the rotary cutting tool 1.

It is to be noted that the support pad 5 is slightly inclined with respect to the axis x of rotation so that the first support surface 16, see FIG. 1, will be in contact with the wall of the hole whereas the second support surface 17 will be released from the wall of the hole and thus have a less active role during the operation. It is thus one of the first and second support surfaces 16, 17 that is closest to the forward end 1a that is providing the main supporting and guiding function during operation.

It is to be noted, that the support pad 5 may be indexable so that the second support surface 17 may provide the main supporting and guiding function, see further below.

Each of the first support surface 16 and the second support surface 17 are convexly curved as viewed in a plane perpendicular to the central longitudinal axis a, see especially FIG. 5. The radius of curvature of the first support surface 16 and the second support surface 17 may be constant along the whole width of the first support surface 16 and the second support surface 17. It is, however, also possible to let the radius of curvature vary so that the radius of curvature in a central area of the first support surface 16 and the second support surface 17 is greater than the radius of curvature at outer areas of the first support surface 16 and the second support surface 17.

In the first embodiment, a depressed central region 18 is provided between the first support surface 16 and the second support surface 17. The central hole 8 extends through the support pad 5 in the central region 18. In the first embodiment, the depressed central region 18 extends from the first longitudinal edge side 11 to the second longitudinal edge side 12.

The support pad 5 also has a bottom surface 19 opposite to the first support surface 16, the second support surface 17, and the central region 18. In the embodiments disclosed, the bottom surface 19 has a planar abutment surface for abutment against a bottom surface of the seat 6.

In the first embodiment, the support pad 5 includes two first recesses 20, which extend into the first support surface 16 in a direction from the longitudinal edge side 11 towards the second longitudinal edge side 12. Each of the two first recesses 20 extends to a respective final position on the first support surface 16.

The first recesses 20 form an inlet opening for the cooling and/or lubricating liquid. The inlet opening meets the rotary direction R and is located at the first longitudinal edge side 11 in the first embodiment.

The two first recesses 20 will permit cooling and/or lubricating liquid to be supplied to and collected in the first recesses 20 during operation of the rotating cutting tool 1. A pressure will be created in the first recesses 20, which will press the cooling and/or lubricating liquid towards the wall of the hole being drilled and thereby permit a film of cooling and/or lubricating liquid to be created between the first support surface 16 and the wall of the hole.

Each of the first recesses 20 has a first side 21, a second side 22 and a bottom 23. There may be a radius, or small radius, of curvature at the transition between the first side 21 and the bottom 23, and at the transition between the second side 22 and the bottom 23.

Each of the first recesses 20 has a flow area which decreases towards the final position. The flow area is a cross-sectional area in a plane parallel to the central longitudinal axis a, and to the central axis c. Such a decreasing flow area is in the first embodiment obtained by each of the first recesses 20 tapering towards the final position on the first support surface 16 seen in a normal direction to the first support surface 16. Consequently, the first side 21 and the second side 22 approach each other to meet at the final position.

At the final position there may be a radius, or small radius, of curvature, where the first side 21 and the second side 22 meet.

In the first embodiment, the first side 21 and the second side 22 are convexly curved, or slightly convexly curved, seen in a normal direction to the first support surface 16.

The first side 21 and the second side 22 form an angle seen in a normal direction to the first support surface 16. In the first embodiment the angle is an acute angle. The angle may be at the most 90°, preferably at the most 70°, more preferably at the most 50° and most preferably at the most 30°.

The first support surface 16 has a first border line 26, which has a portion extending in the proximity of the first longitudinal edge side 11. In the first embodiment, the first border line 26 is not straight but slightly convex. Moreover, in the first embodiment the first border line 26 changes direction abruptly close to the first longitudinal edge side 11.

The second support surface 17 has a second border line 32, which has a portion extending in the proximity of the second longitudinal edge side 12. Also the second border line 32 is not straight but slightly convex and changes direction abruptly close to the second longitudinal edge side 12.

The two first recesses 20 extend at least from the first border line 26 to the final position. In the first embodiment, the recesses 20 start before the first border line 26 directly from the first longitudinal edge side 11.

The support pad 5 has a first bevel surface 27 connecting the first longitudinal edge side 11 to the first support surface 16. In the first embodiment, the first bevel surface 27 comprises a curved bevel surface. The first bevel surface 27 will strengthen the support pad 5 at the transition between the first longitudinal edge side 11 and the first support surface 16.

As for the first support surface 16, the support pad 5 includes a second bevel surface 33 connecting the second longitudinal edge side 12 to the second support surface 17. Also the second bevel surface 33 comprises a curved bevel surface.

The final position of the two recesses 20 is located within a first mid-area 28 on the first support surface 16. The first mid-area 28 is indicated by two dashed lines in FIG. 7 and extends symmetrically from the central longitudinal axis a, and has a width of at the most 80% of the width of the support pad 5, preferably at the most 67% of the width of the support pad 5.

Also the second support surface 17 has a second mid-area 31, which is indicated by dashed lines in FIG. 7 and extends symmetrically from the central longitudinal axis a, and has a width of at the most 80% of the transversal width of the support pad 5, preferably at the most 67% of the transversal width of the support pad 5.

The support pad 5 of the first embodiment is exchangeable, and indexable by being rotated around the central axis c. However, no recess is provided at the second support surface 17. Thus, the support pad 5 will operate as a conventional support pad when indexed so that the second support surface 17 is closest to the forward end 1a of the rotating cutting tool 1.

FIGS. 12-14 disclose a second embodiment, which differs from the first embodiment disclosed in FIGS. 3-11 in that two second recesses 30 are provided at the second support surface 17. The two second recesses 30 extend into the second first support surface 17 in a direction from the second longitudinal edge side 12 towards the first longitudinal edge side 11.

It is to be noted that the same reference signs have been used for elements have the same or similar function in all embodiments disclosed.

Also each of the two second recesses 30 has a flow area which decreases towards the final position. The two second recesses 30 have a configuration that is identical to the configuration of the two first recesses 20, but are turned in the opposite direction with the inlet opening for the cooling and/or lubricating liquid located at the second longitudinal edge side 12. Thus, each of the two second recesses 30 has a first side 21, a second side 22 and a bottom 23.

The two second recesses 30 extend to a final position located within the second mid area 31 on the second support surface 17.

The two second recesses 30 extend at least from the second border line 32 to the final position. The two second recesses 30 starts before the second border line 32 directly from the second longitudinal edge side 12.

The support pad 5 according to the second embodiment is exchangeable and indexable around the central axis c. The configuration and the properties of the support pad 5 will be identical when the first support surface 16 is closest to the forward end 1a and when the second support surface 17 is closest to the forward end 1a.

FIGS. 15-17 disclose a third embodiment which differs from the second embodiment in FIGS. 12-14 in that only one first recess 20 is provided in the first support surface 16, and that only one second recess 30 is provided in the second support surface 17.

Moreover, the first and second sides 21, 22 of the first recess 20 and of the third recess 30 are straight, and meet at the final position on the respective support surface 16, 17. In the second embodiment, there is no radius at the transition between the first side 21 and the second side 22. It is to be noted, however, that such a radius may be present even if the first and second sides 21, 22 are straight.

In addition, the depressed central region 18 does not extend to the first longitudinal edge side 11 and to the second longitudinal edge side 12. As can be seen, the first support surface 16 and the second support surface 17 both extend to the central transversal axis b along a respective outer region outside the central region 18. Thus, the first support surface 16 and the second support surface 17 meet each other at the central transversal axis b.

Moreover, the first bevel surface 27 and the second bevel surface 33 both extend in parallel with the first longitudinal edge side 11 and the second longitudinal edge side 12. The first longitudinal edge side 11 and the second longitudinal edge side 12 are straight.

In the third embodiment, the first bevel surface 27 and the second bevel surface 33 include a primary straight bevel surface and a secondary straight bevel surface forming an obtuse angle with each other.

FIGS. 18-20 disclose a fourth embodiment which differs from the third embodiment in FIGS. 15-17 in that three first recesses 20 are provided in the first support surface 16, and in that three second recesses 30 are provided in the second support surface 17. Each of the first and second recesses 20, 30 is identical to the first and second recesses 20, 30 in the third embodiment.

FIGS. 21-23 disclose a fifth embodiment which differs from the third embodiment in FIGS. 15-17 in that first recess 20 in the first support surface 16, and the second recess 30 in the second support surface 17 have a first side 21 and a second side 22 that are parallel with each other seen in a normal direction to the first support surface 16 and the second support surface 17, respectively. Thus, the first and second sides 21, 22 extend to an end side 36 at the final position. The end side 36 is parallel with the central longitudinal axis a.

However, as in the preceding embodiments, the first recess 20 and the second recess 30 have a flow area which decreases towards the final position. The decreasing flow area of the first recess 20 is obtained by a decreasing distance between the bottom 23 of the first recess 20 and the first support surface 16. In the same way, the decreasing flow area of the second recess 30 is obtained by a decreasing distance between the bottom 23 of the second recess 30 and the second support surface 17.

Such a decreasing distance or depth also results in a decreasing flow area of the first recess and the second recess towards the respective final position, and thus in a high pressure in the first recess. It is to be noted that this embodiment with a decreasing distance or depth also may include first and second sides 21, 22 that are converging or even diverging.

It is to be emphasized that the support pad 5 may have 1-5 or even more recesses 20, 30 of the different kinds disclosed.

The bevel surfaces 27, 33 may be replaced by a shorter radius of curvature of the first support surface 16 and the second support surface 17 in the proximity of the first longitudinal edge side 11 and the second longitudinal edge side 12, respectively.

It is to be mentioned, that the support pad 5 may be indexable around the central longitudinal axis a or the central transversal axis b. In this case, the bottom surface 19 is replaced by a surface configuration of the kind disclosed in any of the above discussed embodiments.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A support pad for a rotating cutting tool configured to rotate around an axis of rotation in a rotary direction, the support pad defining a central longitudinal axis and comprising:
   a first longitudinal edge side;
   an opposite second longitudinal edge side;
   a first transversal edge side;
   an opposite second transversal edge side;
   at least a first support surface, which is convexly curved as viewed in a plane perpendicular to the central longitudinal axis; and at least one first recess, which extends into the first support surface in a direction from the first longitudinal edge side towards the second longitudinal edge side, wherein said at least one first recess extends to a final position on the first support surface, said at least one first recess having a flow area which decreases towards the final position.

2. A support pad according to claim 1, wherein said at least one first recess tapers towards said final position on the first support surface seen in a normal direction to the first support surface.

3. A support pad according to claim 1, wherein said at least one first recess has a bottom, a first side and a second side.

4. A support pad according to claim 1, wherein the first support surface has a first border line in the proximity of or adjoining the first longitudinal edge side, and wherein the at least one first recess extends at least from the first border line to the final position.

5. A support pad according to claim 1, further comprising a first bevel surface connecting the first longitudinal edge side to the first support surface.

6. A support pad according to claim 5, wherein the first bevel surface comprises a straight bevel surface and/or a curved bevel surface.

7. A support pad according to claim 1, wherein the final position is located in a mid-area on the first support surface.

8. A support pad according to claim 1, wherein the first longitudinal edge side of the support pad is configured to form a forward edge side with respect to the first support surface and the rotary direction.

9. A support pad according to claim 1, wherein the support pad defines a central transversal axis perpendicular to the central longitudinal axis, and wherein the first support surface is located between the first transversal edge side and the central transversal axis.

10. A support pad according to claim 9, further comprising a second support surface, which is convexly curved as viewed in a plane perpendicular to the central longitudinal axis.

11. A support pad according to claim 10, wherein the second support surface is located between the second transversal edge side and the central transversal axis.

12. A support pad according to claim 11, further comprising at least one second recess, which extends into the second support surface in a direction from the second longitudinal edge side towards the first longitudinal edge side to a final position on the second support surface.

13. A support pad according to claim 12, wherein said at least one second recess has a flow area which decreases towards the final position.

14. A support pad according to claim 10, wherein the second longitudinal edge side of the support pad is configured to form a forward edge side with respect to the second support surface and the rotary direction.

15. A cutter head for a rotating cutting tool configured to rotate around an axis of rotation in a rotary direction, the cutter head comprising at least one seat configured to receive a support pad, the support pad defining a central longitudinal axis and including a first longitudinal edge side, an opposite second longitudinal edge side, a first transversal edge side, an opposite second transversal edge side, at least a first support surface convexly curved as viewed in a plane perpendicular to the central longitudinal axis, and at least one first recess extending into the first support surface in a direction from the first longitudinal edge side towards the second longitudinal edge side, said at least one first recess extending to a final position on the first support surface, said at least one first recess having a flow area which decreases towards the final position.

16. A cutter head according to claim 15, wherein the support pad includes a second support surface convexly curved as viewed in a plane perpendicular to the central longitudinal axis, the second support surface being located between the second transversal edge side and the central transversal axis.

17. A cutter head according to claim 16, wherein the support pad includes at least one second recess, which extends into the second support surface in a direction from the second longitudinal edge side towards the first longitudinal edge side to a final position on the second support surface.

18. A cutter head according to claim 17, wherein said at least one second recess has a flow area which decreases towards the final position.

19. A cutter head according to claim 17, wherein the second longitudinal edge side of the support pad is configured to form a forward edge side with respect to the second support surface and the rotary direction.

* * * * *